Sept. 9, 1969  R. L. REYNOLDS  3,465,614
POWER TRANSMISSION CONTROL SYSTEM WITH TEMPERATURE COMPENSATION
Filed Feb. 2, 1968  5 Sheets-Sheet 1

INVENTOR:
ROBERT L. REYNOLDS
BY
ATTORNEYS.

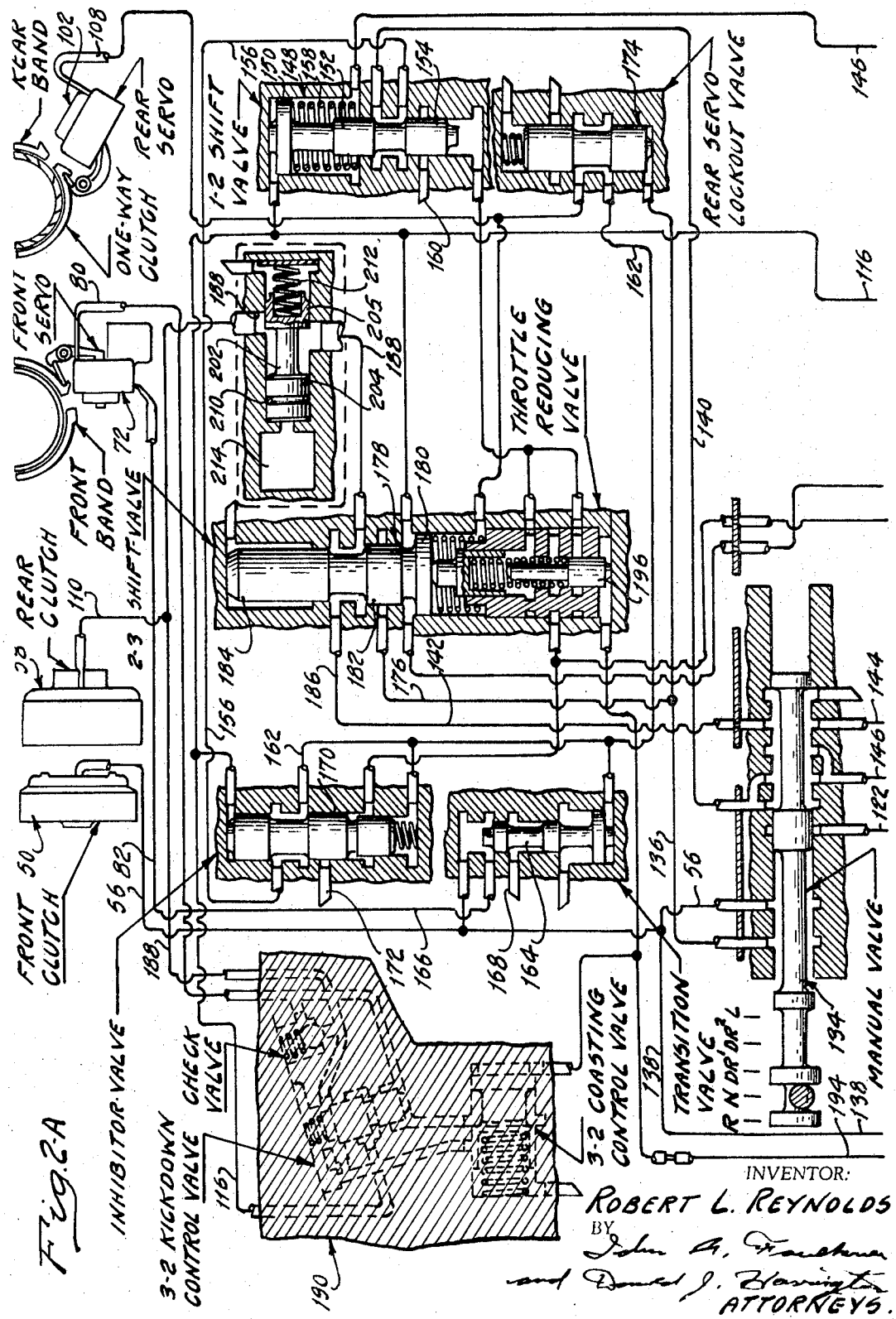

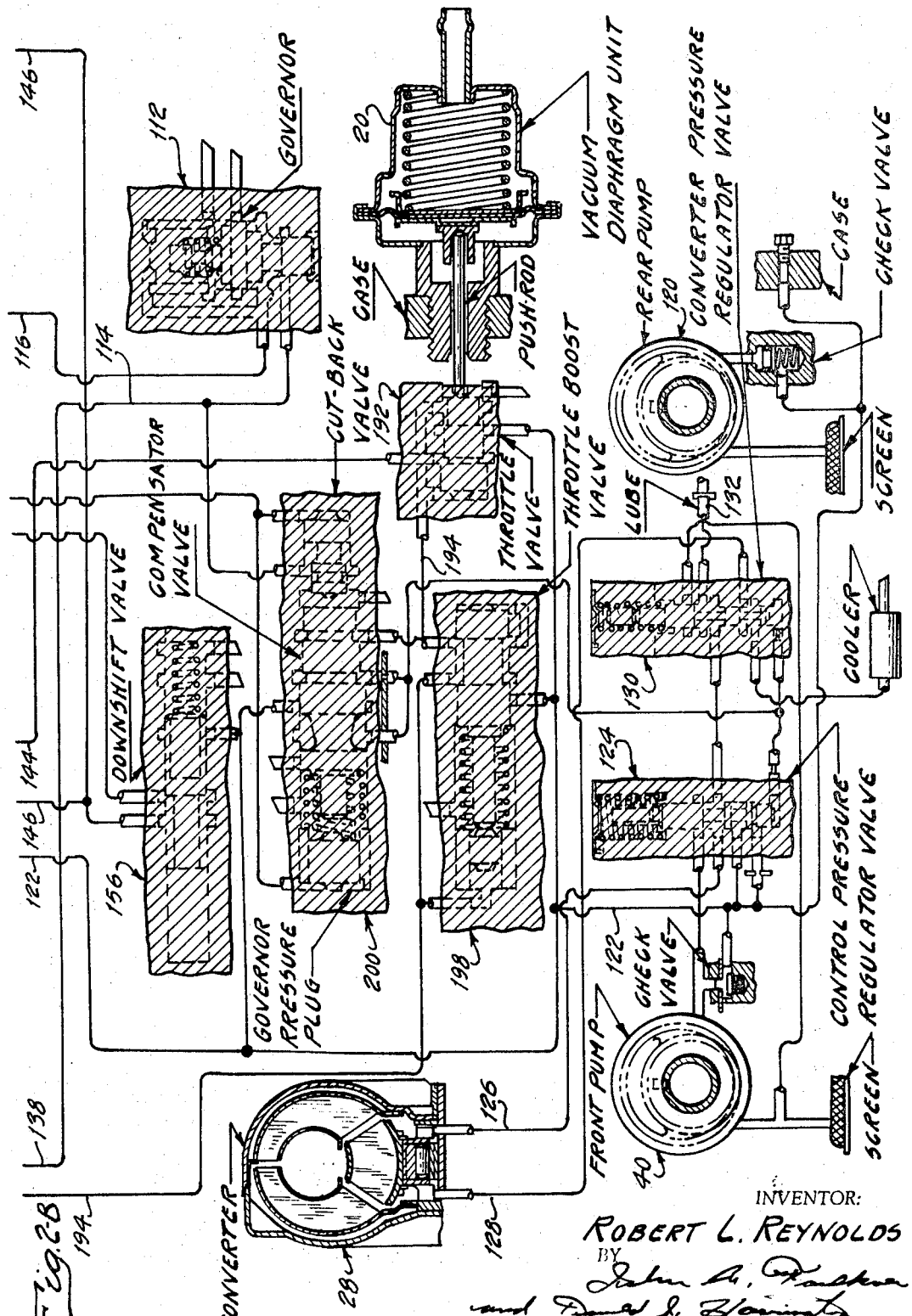

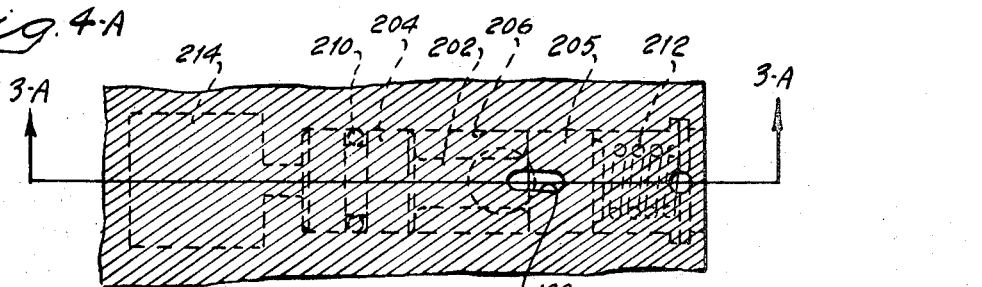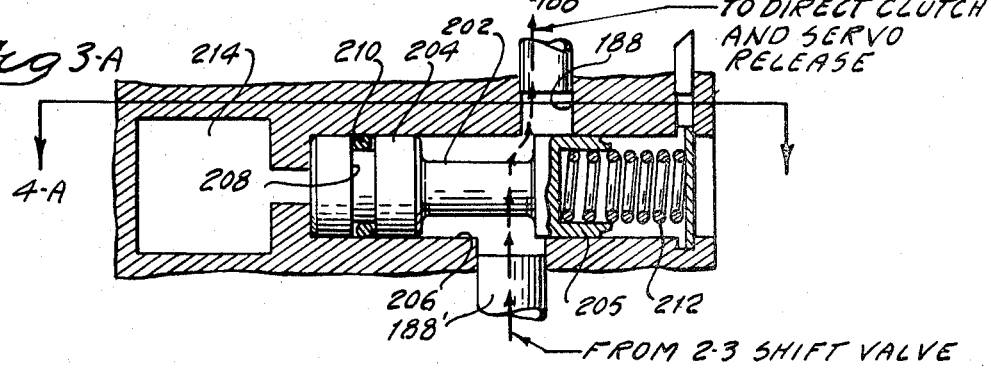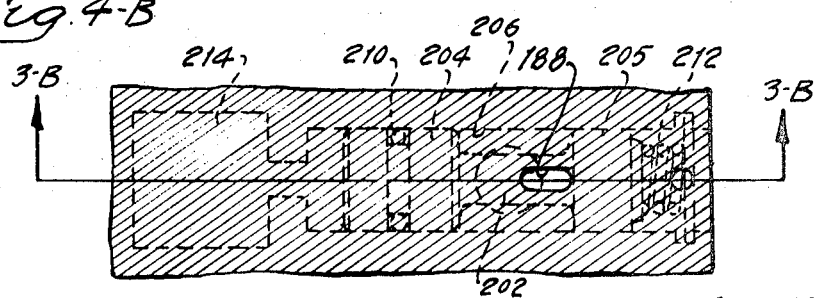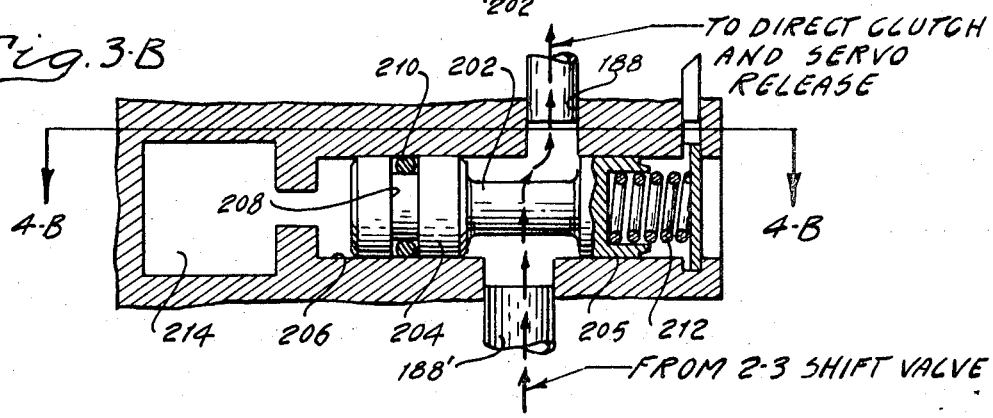

Sept. 9, 1969 R. L. REYNOLDS 3,465,614
POWER TRANSMISSION CONTROL SYSTEM WITH TEMPERATURE COMPENSATION
Filed Feb. 2, 1968 5 Sheets-Sheet 5
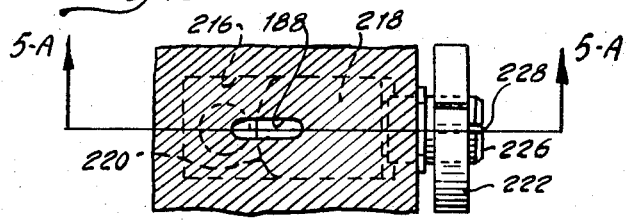
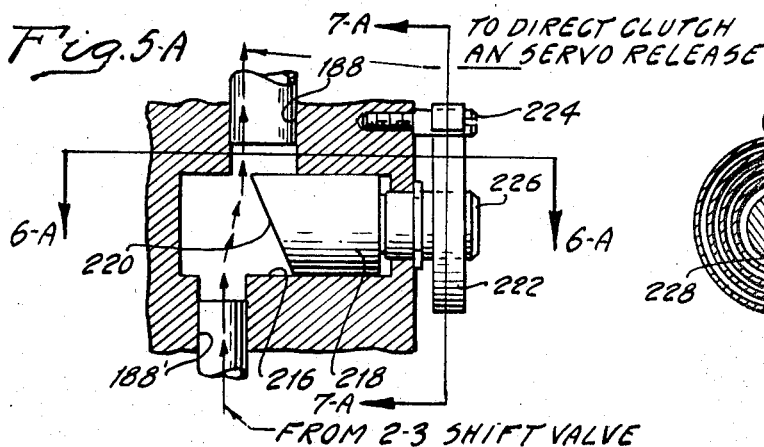
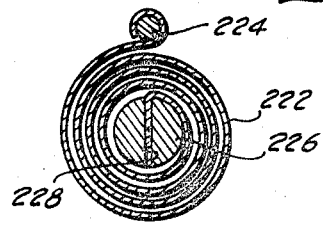
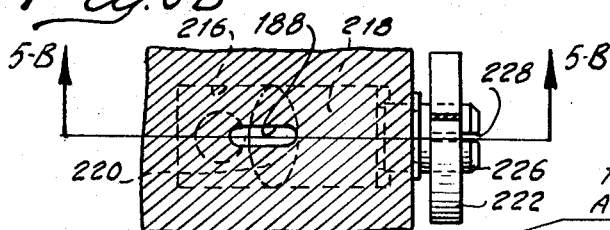
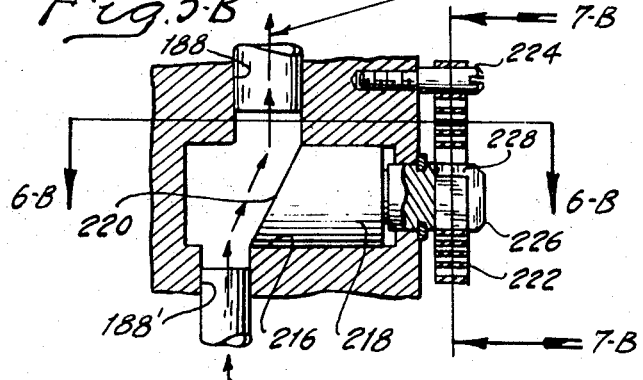
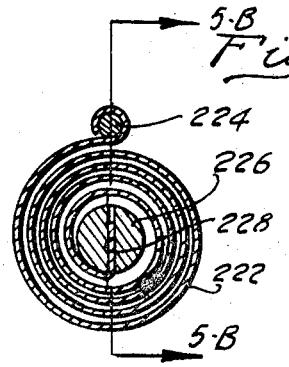
INVENTOR:
ROBERT L. REYNOLDS
BY
ATTORNEYS.

United States Patent Office 3,465,614
Patented Sept. 9, 1969

3,465,614
POWER TRANSMISSION CONTROL SYSTEM WITH TEMPERATURE COMPENSATION
Robert L. Reynolds, Detroit, Mich., assignor to Ford Motor Company, Dearborn, Mich., a corporation of Delaware
Filed Feb. 2, 1968, Ser. No. 702,638
Int. Cl. F16h *57/10;* F16d *9/00*
U.S. Cl. 74—763  7 Claims

ABSTRACT OF THE DISCLOSURE

This specification describes a control valve system for an automatic power transmission in an automotive vehicle driveline. The valve system includes a flow control valve that is sensitive to temperature changes as it provides a uniform, calibrated ratio shift pattern regardless of changes in the Reynolds number for the fluid.

GENERAL DESCRIPTION OF THE INVENTION

My invention relates generally to geared, power transmission systems for use in automotive vehicle drivelines, It relates more particularly to multiple-ratio, power transmission systems having rotary torque transmitting gear elements with friction clutches and brakes for controlling the relative motion of the elements to establish various speed ratios. The clutches and the brakes are actuated and released by fluid pressure operated servos.

The impeller of the torque converter is connected directly to an internal combustion engine. The driven element of the torque delivery paths is connected to a power output shaft, which drives the traction wheels.

In a preferred form of my invention, a direct-drive speed ratio is established when the turbine is connected simultaneously through independent, pressure operable clutches to separate torque input elements of the gearing. This causes the elements of the gearing to rotate in unison, thereby driving the driven shaft at the speed of rotation of the turbine.

An intermediate underdrive ratio is obtained when one of the clutches is released and a friction brake band is applied, thereby anchoring an intermediate speed ratio reaction gear element. A second brake is used for anchoring a first speed ration reaction gear element during operation in the lowest underdrive speed ratio.

When the vehicle is accelerated from a standing start with any given engine torque, speed ratio changes will occur automatically as the clutch and brake servos are actuated. The servos are pressurized by a positive displacement pump which is driven by the vehicle engine. The operation of the engine driven pump can be supplemented, if desired, by a second positive displacement pump that is drivably connected to the driven shaft. Conduit structure connects the fluid pressure source to the various servos.

Shift valves are disposed in and partly define the conduit structure for controlling the distribution of pressure to the various servos. The shift valves in turn respond to vehicle speed signals and to a pressure signal that is proportional in magnitude to either engine torque or engine torque demand.

The reaction brake servo that is used for initiating intermediate, underdrive ratio operation comprises a servo cylinder and a double-acting servo piston. The piston and the cylinder cooperate to define opposed fluid pressure chambers. When both of the chambers are pressurized, the intermediate servo is released. When only one of the chambers is pressurized, however, the intermediate servo becomes applied.

In order to establish proper timing in the speed ratio transition between the direct-drive ratio and the intermediate speed ratio, the fluid pressure operated clutch is in fluid communication with the brake release fluid pressure chamber of the intermediate speed ratio brake servo. Thus pressure distribution to the direct-drive clutch and to the intermediate speed ratio brake servo is controlled by a common shift valve. When the shift valve responds to pressure signals in the control system to initiate a change in ratio from the intermediate speed ratio to the direct-drive ratio, it is moved to a pressure distributing position as it simultaneously pressurizes the direct-drive clutch and the release chamber of the intermediate speed ratio brake servo.

It is desirable to provide a controlled degree of overlap during a speed ratio change from the intermediate speed ratio to the direct-drive ratio by causing the brake band release to be delayed before the clutch is applied fully during acceleration of the vehicle under torque. This avoids a temporary interruption in the torque delivery path. Such interruption normally would tend to cause the vehicle engine to "run-away" or to accelerate to an undesirably high speed during the shift interval. Under other driving conditions, however (for example, during a down shift from the high speed ratio to the intermediate speed ratio), the timing of the disengagement of the clutch and the engagement of the brake differs in character from the required timing during an upshift. The servos themselves can be calibrated appropriately to produce the most favorable timing during both an upshift and a downshift.

I have found that the desired timing during a 2–3 upshift is influenced considerably by changes in temperature. In a preferred form of my invention, pressure is distributed to the high speed ratio clutch through internal passage structure formed in the element of the gearing and through an intermediate shaft situated coaxially with respect to the other clutch and with respect to the gear assembly. In contrast to the pressure distribution path for the clutch, which is relatively circuitous, the pressure delivery path extending from the shift valve to the brake servo is relatively direct. There thus is more tendency for a pressure drop to occur in the feed passage for the clutch than there is in the feed passage for the brake.

In order to stabilize and to control the release of the brake and the application of the clutch during a 2–3 upshift, a flow-restricting orifice can be provided in the common feed passage extending to the clutch and the brake on the fluid pressure output side of the shift valves. This will delay release of the brake relative to the application of the clutch during a 2–3 upshift.

An orifice of this type is incapable of compensating for changes in the viscosity due to changes in temperature of the operating fluid. Any fluid flow restriction in the feed passages for the clutch and the brake, and any changes in viscosity due to changes in temperature, will affect adversely the shift timing during a 2–3 upshift.

If it is assumed that the timing is proper when the operating temperature of the fluid is low, the circuitry will cause an undesirable "tie-up" during speed ratio changes at normal operating temperatures. On the other hand, if the system is calibrated and the fixed orifices are calibrated to cause proper timing when the operating fluid is at a high-operating temperature, an undesirable engine "run-away" will be experienced during the 2–3 upshift that occurs when the operating fluid temperature is low. It is an object of my invention, therefore, to overcome this shortcoming by providing a thermostatically controlled shift valve system which will effect proper shift timing regardless of temperature changes as the transmission shifts from an intermediate speed ratio to a direct-drive ratio.

A thermostatically controlled orifice is situated in the servo feed passage at a location between the shift valve and the pressure chambers for the clutch and brake servos. It provides a small flow area during operation at low temperature to eliminate engine "run-away," and it provides a relatively larger orifice at higher temperatures to reduce friction element "tie-up."

BRIEF DESCRIPTION OF THE FIGURES OF THE DRAWINGS

FIGURES 2A and 2B show in schematic form a valve system capable of controlling the clutches and brakes in the gearing arrangement of FIGURE 1.

FIGURES 3A and 3B show a thermostatically controlled valve orifice for use in combination with the shift valves of FIGURE 2A. In FIGURE 3A the valve orifice is shown in a relatively restricted position. In FIGURE 3B the orifice is in a free-flow open position.

FIGURES 4A and 4B, respectively, show the degree of valve opening indicated in FIGURES 3A and 3B. FIGURES 4A and 4B are taken along the planes of section line 4A—4A indicated in FIGURES 3A and 3B, respectively.

FIGURES 5A and 5B show an alternate form of a variable shift valve orifice for use with shift valves of FIGURES 2A and 2B. In FIGURE 5A the valve is shown in a relatively closed position and in FIGURE 5B it is shown in a free-flow, open position.

FIGURES 6A and 6B show, respectively, the valve opening indicated in FIGURES 5A and 5B. FIGURES 6A and 6B are taken along the planes of section line 6A—6A and 6B—6B of FIGURES 5A and 5B.

FIGURES 7A and 7B show, respectively, the end views of the valves indicated in FIGURES 5A and 5B. The valve position indicated in FIGURE 7A is 180° out of position with respect to the valve position shown in FIGURE 7B.

PARTICULAR DESCRIPTION OF THE INVENTION

Figure 1:
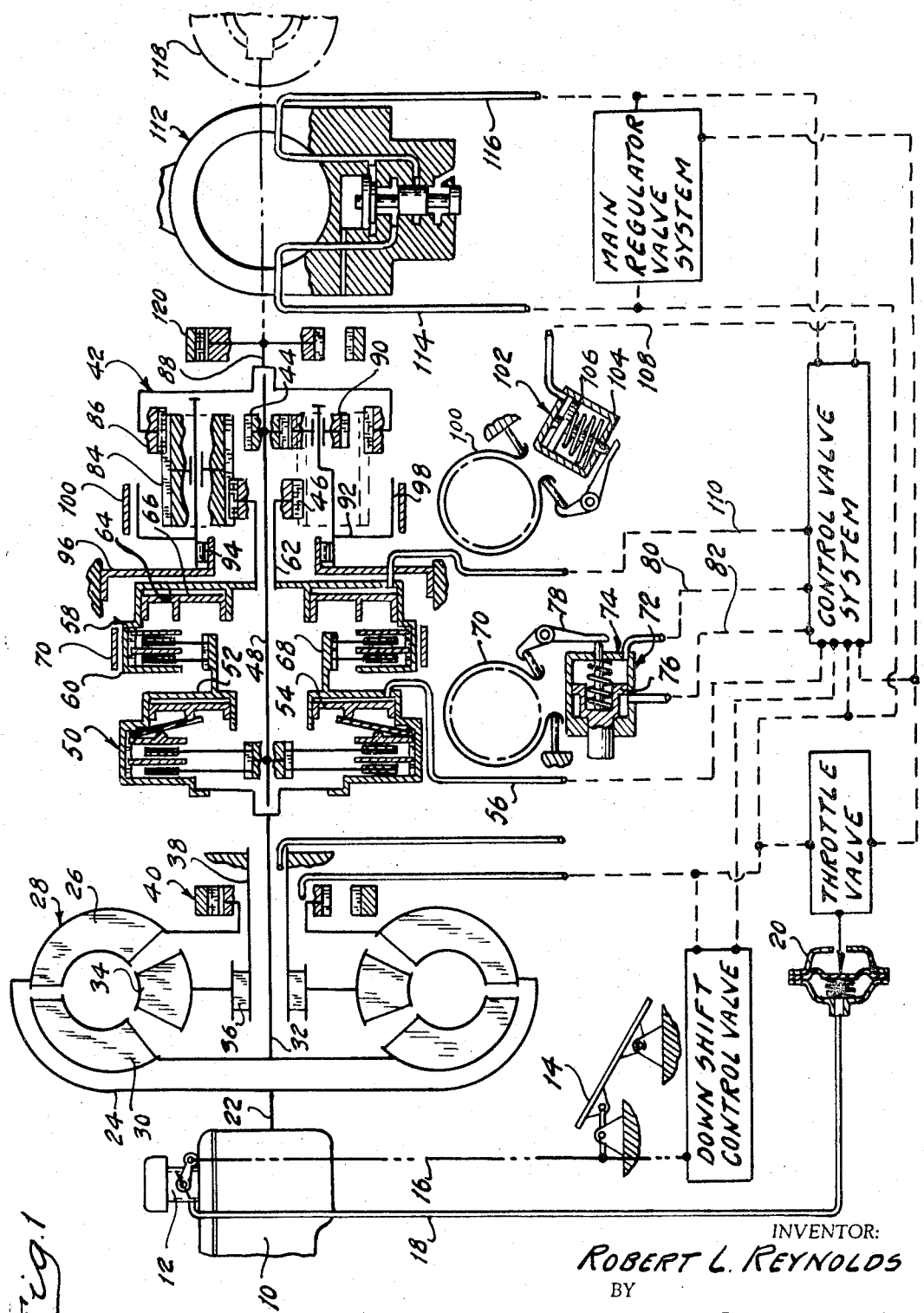
FIGURE 1 shows in schematic form a gearing arrangement with which my improved control system may be used.

For purposes of the present description, reference may be made to U.S. Patent No. 3,095,755 which shows in detail a gearing arrangement capable of accommodating the improvement of my invention. It includes a direct-drive clutch and a circuitous feed passage for delivering operating pressure to the clutch servo pressure chamber. That feed passage is defined in part by a pair of concentric, flow-directing, tubular inserts in the sun gear shaft. Fluid pressure is distributed through the annular passage defined by these tubular inserts from the right-hand end thereof to the radial pressure port for the clutch pressure chamber. That patent is assigned to the assignee of my instant invention.

In FIGURE 1, numeral 10 designates an internal combustion engine used in an automotive vehicle driveline. It is provided with an air-fuel mixture intake manifold 12 having a carburetor and an adjustable carburetor throttle that in turn is under the control of the vehicle operator by means of an accelerator pedal 14. This pedal is connected through a mechanical linkage 16 to the carburetor throttle valve.

The manifold pressure passage 18 communicates with the manifold 12 at a point on the downshift side of the throttle valve. Passage 18 extends to a manifold pressure operated servo 20 which forms a part of a throttle valve system in the automatic control valve system that will be described with reference to FIGURE 2B.

The driver-controlled accelerator pedal 14 is connected also to a downshift control valve which forms also a part of the control valve system. The upshift valve responds to movement of the accelerator pedal to a wide open throttle position to initiate a forced downshift under certain driving conditions.

The crankshaft 22 of the engine 10 is connected to the drive shell 24 of the impeller 26 for a hydrokinetic torque converter unit 28. The impeller 26 is situated in toroidal fluid-flow relationship with respect to a bladed turbine 30 which is drivably connected to a turbine shaft 32. A bladed stator 34 is located between the flow exit section of the turbine 30 and the flow entrance section of the impeller 26. It functions in the usual fashion to change the tangential component of the absolute fluid-flow velocity vector for the fluid at the radially inward region of the torus. Forces acting on the bladed stator 34 are transmitted through an overrunning brake 36 to a stationary sleeve shaft 38, which is connected to the relatively stationary transmission housing. The stator 34 can rotate in the usual fashion in the direction of rotation of the impeller, but motion in the opposite direction is prevented by the brake 36.

The hub of the impeller 26 is connected drivably to a positive displacement fluid pump 40. This pump is located in a pump chamber formed in part by the transmission housing. The pump acts as a pressure source for the control system that will be described with reference in FIGURES 2A and 2B.

The compound planetary gear unit 42 includes a first sun gear 44 which has a relatively small pitch diameter. It includes also a larger pitch diameter sun gear 46. Sun gear 44 is connected to sun gear shaft 48 which can be connected to turbine driven shaft 32 by means of a forward, selectively-engageable, friction clutch 50. Clutch 50 can be engaged and released by means of a fluid pressure operated servo that includes an annular cylinder 52 and a cooperating annular piston 54. Cylinder 52 forms in part a clutch drum which carries friction clutch discs of the clutch 50. Companion friction clutch discs of the clutch 50 are carried by the sun gear shaft 48. Fluid pressure is admitted through a clutch pressure feed passage 56 to the fluid pressure cavity defined by the cylinder 52 and the piston 54. This passage 56 communicates with the control valve system.

A selectively engageable high ratio and reverse ratio clutch is shown at 58. It comprises a drum 60, which is connected to sun gear 46 through sun gear shaft 62. Drum 60 defines also a clutch cylinder 64 which receives an annular piston 66. A first clutch element 68, which is connected to the drum 50, carries friction discs of the clutch 58. Other friction discs of clutch 58 are carried by the drum 60. When fluid pressure is admitted to the annular cylinder 64, the friction discs of the clutch 58 define a driving connection between sun gear 46 and turbine shaft 32. A friction brake band 70 surrounds the drum 60. It can be applied and released by means of a fluid pressure operated brake servo 72. Servo 72 comprises a cylinder 74 which receives a piston 76. A fluid pressure chamber is situated on either side of the piston 76. The pressure forces acting on the piston 76 are transferred to the operating end of the band 70 through a suitable operator 78. Operating pressure is distributed to the release side of the piston 76 through a feed passage 80. Pressure is distributed to the other side of the piston 76, which is the apply side of the servo, through a feed passage 82.

Gear unit 42 includes a set of long planet pinions 84, which mesh with sun gear 46 and with a ring gear 86. Ring gear 86 in turn is connected to a driven shaft 88.

A set of short planet pinions 90 mesh with the small diameter sun gear 44 and also with the long planet pinions 84. All sets of pinions 84 and 90 are journalled rotatably upon a common carrier 92. The carrier is braked by an overrunning brake shown at 94. The reaction torque acting upon the carrier 92 is distributed through the brake 94 to an intermediate bearing support wall 96, which is connected directly to the transmission housing. The carrier 92 includes a brake drum 98 around which a friction brake band 100 is positioned. The band 100 can be applied and released by means of a fluid pressure operated brake servo 102 which comprises a cylinder 104 and a cooperating piston 106. The piston is in force transmitting relationship with respect to the operating end of the band 100. Fluid pressure is admitted to the working chamber defined by the piston 106 and the cylinder 104 through a feed passage 108, which communicates with the control valve system. The feed passage for the servo for the clutch 58, which is shown at one end, also communicates with the control valve system.

A fluid pressure governor 112 is connected drivably to the power output shaft 88. It receives fluid pressure from a supply passage 114, which communicates with the pump. It modulates this pressure to produce a pressure signal in passage 116 that is proportional in magnitude to the driven speed of the shaft 88.

The main regulator valve system, which also is schematically shown in FIGURE 1, is in communication with the fluid pressure supply pump. It regulates the pressure at a predetermined value, which is determined by the operating requirements, as will be explained subsequently.

The power output shaft 88 is connected through a suitable drive shaft and a differential-and-axle assembly, not shown, to the vehicle traction wheels 118.

During acceleration from a standing start, the forward clutch 50 is applied, thereby connecting directly the driven shaft 32 with the sun gear 44. The hydrokinetic unit 28 multiplies engine torque. The sun gear 44, which acts as a power input gear element, receives the turbine torque that is developed. The carrier acts as a reaction member since it is anchored by overrunning brake 94.

Sun gear 44 drives pinions 90, which in turn drive pinions 84. These pinions in turn rotate the ring gear 86 in the direction of rotation of the impeller, but at a reduced speed ratio.

If coast braking is desired, brake band 100 can be applied. The carrier 92 then is capable of accommodating reaction torque regardless of its direction.

To initiate a speed ratio change from the low speed ratio to the intermediate speed ratio, brake band 70 is applide by distributing pressure to the left-hand side of the piston 76. This anchors the sun gear 46 so that it can function as a reaction element. This causes the carrier 92 to rotate at a reduced speed in the direction of rotation of the impeller. The ring gear 86 then is driven at an increased speed, thereby producing an intermediate under-drive ratio. Overrunning brake 94 free-wheels under these conidtions. The forward brake 50 is applied continuously during operation in each of the forward driving speed ratios.

To effect a speed ratio change from the intermediate, underdrive ratio to a direct-drive, high speed ratio, the brake band 70 is released and direct and reverse clutch 58 is applied in sequence with release of the band 70. The band 70 is released by distributing pressure through passage 80 to the right-hand side of the piston 76 while the left-hand side of the piston remains pressurized. The area of differential on the piston 76 is such that it will shift in a left-hand direction when both of the pressure chambers and cylinder 74 are pressurized. The clutch 58 becomes applied and the brake 70 becomes released in timed sequence, thereby effecting a smooth speed ratio change. When both clutches are applied, turbine shaft 32 becomes connected simultaneously to each of the sun gears, thereby causing the elements of the gear unit to rotate together in unison with a 1-1 speed ratio.

In FIGURE 2B there is shown a second positive displacement pump 120. This is connected drivably to the power output shaft 88. The discharge side of the pump 120 is connected through a one-way check valve with a line pressure passage 122. The front pump 40 is connected to the passage 122 through a front pump check valve. The front pump check valve is opened whenever the discharge pressure of the front pump exceeds the discharge pressure of the rear pump.

A control pressure regulator valve 124 regulates at a precalibrated value the line pressure in passage 122. It controls also distribution of fluid pressure to the torus circuit of the torque converter 28. The torque converter feed passage is shown at 126. The return flow passage for the torque converter circuit is shown at 128. It communicates with a converter pressure regulator valve 130. The discharge side of the regulator valve 130 communicates with the lubrication circuit through lube passage 132.

Line pressure passage 122 communicates with manual valve 134. This valve has several operating positions which are identified by the symbols R, N, Drive 1, Drive 2 and L. These, respectively, refer to the reverse position, the neutral position, the first drive range position, the second drive range position and the low drive position. When the valve 134 assumes the position shown, which is the neutral position, passage 122 is blocked. At this time the clutch and brake servos are exhausted. When the manual valve 134 is shifted to the Drive 1 position, passage 122 is brought into fluid communication with passages 136 and 138. Passage 140, which extends to the low-and-reserve servo 102 through a path that will be described subsequently, is exhausted. Passage 142, which distributes fluid pressure to the high speed ratio and reverse clutch, also is exhausted. Passage 144 distributes line pressure to a differential area on the throttle valve.

During reverse drive operation, passage 144 is exhausted. Passage 146, which extends through the downshift valve to the 1-2 shift valve, which will be described subsequently, also is exhausted.

When the manual valve assumes the Drive 1 position, the transmission system is capable of undergoing two speed ratio changes during the acceleration period. If the manual valve assumes the Drive 2 position, however, the transmission system will accelerate from a standing start in the intermediate, under-drive ratio. Only one subsequent upshift will be obtained during the acceleration period as the intermediate speed brake servo becomes released and the direct-and-reverse clutch becomes applied. If the manual valve assumes the L position, the transmission system will be conditioned for continuous operation in the lowest, underdrive speed ratio. Upshifts to the intermediate speed ratio and to the direct-drive speed ratio are prevented.

If we assume for present purposes that the manual valve 134 is in the Drive 1 position, passage 56, which communicates directly with passage 138 is pressurized, thereby causing the front clutch to become applied. As explained previously, this conditions the gearing for low speed ratio operation.

A 1-2 shift valve is shown at 148. It includes a governor pressure land 150 and a pair of pressure distributing lands 152 and 154. Governor pressure is distributed to the upper side of the land 150 through governor pressure passage 11. A downshift valve signal from the downshift valve 156 acts on the lower end of the land 150 when a forced downshift is initiated by the downshift valve. When the 1-2 shift valve assumes the position shown, passage 140 is brought into communication with passage 156. On the other hand, when the downshift valve is moved in a downward direction against the opposing force of spring 158, passage 156 becomes exhausted through port 160.

When the governor pressure is sufficient to cause the 1-2 shift valve to move in a downward direction, pressure then is distributed, following a shifting movement of the 1-2 shift valve, through passage 156 and through the inhibitor valve 170 to passage 162. This pressure acts on the lower end of a transition valve 164, causing the latter to move in an upward direction. This establishes communication between passage 166 and an exhaust port 168. Passage 166, which is connected to line pressure passage 138 when the transition valve assumes a downward position, becomes exhausted. This passage communicates directly with the apply side of the intermediate servo 72. Thus, upon movement of the 1-2 shift valve, the servo 72 becomes applied to condition the transmission mechanism for intermediate speed ratio operation.

The inhibitor valve 170 functions to connect passage 156 with passage 162 when it assumes the upper position shown. Governor pressure acts on the upper end of the inhibitor valve 170 and the resulting governor pressure force is opposed by a valve spring. If the governor pressure is sufficiently high to cause the inhibitor valve 170 to move in a downward direction, passage 156 becomes blocked and passage 162 becomes exhausted through the exhaust port 172. If the reverse servo lockout valve 174 is in the position shown at that time, the inhibitor valve 170 will then prevent pressure distribution from passage 162 and through the reverse servo lockout valve to passage 108. The reverse servo lockout valve is in an upward position, however, during operation with the manual valve in the Drive 2 or Drive 1 positions, as explained previously.

Pressurized passage 136 communicates with the 2–3 shift valve feed passage 176. The 2–3 shift valve is identified by reference character 178. It includes a governor pressure land 180 and two spaced pressure distributor lands 182 and 184. Passage 186 acts as an exhaust passage during operation in the Drive 1 range.

When the 2–3 shift valve assumes the position shown, communication is established between exhausted passage 186 and servo feed passage 188. This passage in turn communicates with passage 110 through the circuitous fluid flow path described earlier. Passage 188 communicates also with passage 80 through a 3–2 kickdown valve and 3–2 coasting control valve assembly 190. Passage 80 feeds the release side of the servo 72.

When the 2–3 shift valve moves in a downward direction, passage 188 becomes connected directly with pressurized passage 176. This causes timed engagement of the clutch 58 and release of the brake servo 72.

A shift delay is obtained by distributing throttle pressure from throttle valve 192 through passage 194 to the lower end of the throttle reducing valve 196. Passage 194 is defined in part by a throttle pressure boost valve 198 which magnifies the pressure signal made available to the throttle reducing valve. The throttle reducing valve modulates the throttle pressure distributed to it and distributes the modulated throttle pressure to the lower end of the 2–3 shift valve assembly and to the lower end of the 1–2 shift valve 148. The magnitude of the pressure signal distributed to the shift valves is generally proportional to engine torque demand. The direct output of the throttle valve 192 is distributed, however, to a compensator valve 200 which forms a part of the main regulator valve system. Compensator valve 200 is subjected also to governor pressure, and it utilizes these two signals appropriately to change the magnitude of the regulated pressure level, depending upon the operating requirements.

During operation of the transmission mechanism in the Drive 2 range, passage 140 is exhausted. Thus the feed for the 1–2 shift valve is exhausted and the 1–2 shift valve then is ineffective to distribute pressure to the lower end of the transition valve. Thus the transition valve remains in a downward position regardless of the position of the 1–2 shift valve. Thus the transmission will be conditioned initially for operation in the intermediate drive ratio. In either instance, however, a normal automatic 2–3 upshift occurs upon movement of the 2–3 shift valve 178.

The region in FIGURE 1 identified by the symbol A is the location of the thermostatically controlled variable shift valve orifice shown in FIGURES 2A to 4A. This structure comprises a shift valve spool 202 which has formed thereon a pair of spaced valve lands 204 and 205. The valve spool is slidably situated within a valve chamber 206. Land 204 is formed with an O-ring groove 208, within which is positioned an O-ring seal 210. A valve spring 212 acts upon the right-hand end of valve land 205, thus urging the spool 202 in a left-hand direction.

The portion of passage 188 that communicates directly with the 2–3 shift valve is indicated at 188'. This intersects the chamber 206 at a location intermediate the lands 204 and 205. The portion of the passage 188 that is removed from the 2–3 shift valve is identified in FIGURE 4A by reference character 188. The cross-sectional shape of this passage portion can be seen by referring to FIGURE 4A.

Passage 188 is in continuous communication with the chamber 206 at a location intermediate the valve lands. Valve land 205, however, progressively restricts passage 188, thereby creating a flow restricting orifice. When the land 205 is positioned as shown in FIGURE 3A, the orifice is approximately 25% open.

The left-hand end of the chamber 206 is in fluid communication with a sealed oil chamber 214. This chamber contains a volume of oil which is sealed by the O-ring 210. The chamber 214 is completely filled with a known quantity of fluid. The coefficient of thermal expansion of the fluid is known.

The chamber 214, which forms a part of the valve body and which is immersed in the transmission sump, senses the operating temperature of the transmission fluid. When the operating temperature is low, the valve spool 202 will assume a position similar to that shown in FIGURE 3A. When the operating temperature increases, however, the valve spool 202 will be shifted in a right-hand direction due to the expansion of the volume of the fluid in the chamber 214. As the spool 202 moves, land 205 progressively uncovers passage 188, thereby progressively decreasing the degree of restriction in the common feed passage for the clutch 58 and the servo 72.

In FIGURE 3B I have shown the same valve structure indicated in FIGURE 3A, although the spool 202 is shifted in a right-hand direction until the land 205 completely uncovers the passage 188. The size of the orifice then can be observed by referring to the cross-sectional view of FIGURE 4B. The fluid flow restriction in the common feed passage for the clutch 48 and servo 72 thus is a minimum.

In FIGURES 5A to 6B I have shown an alternate, thermostatically controlled, variable, shift valve orifice. This comprises a valve chamber 216 within which is positioned a rotary valve 218. The main body of valve 218 is in the form of a cylinder which registers with cylindrical walls of the chamber 216. The left-hand end of the valve element 218 is formed with a contoured end 220. As seen in FIGURES 6A, valve element 218 restricts the passage 188. As the valve element 218 rotates, however, the degree of restriction will change as passage 188 becomes progressively uncovered. In the position shown in FIGURE 5A, the valve element 218 is in the maximum flow restricting position.

Rotation of the valve element 218 is accomplished by a thermostatic, bimetallic spring 222. This spring is in the form of concentric coils, the outermost coil being anchored to an anchor pin 224, which is fixed, as seen in FIGURE 5A, to the valve body.

Valve element 218 is formed with a reduced diameter portion 226 which extends outwardly from the valve body. As seen in FIGURE 7A, the portion 226 is slotted at 228 to receive the innermost coil of the spring 222.

It will be apparent that the bimetallic spring will respond to changes in temperature to cause the valve element 218 to rotate. The assembly can be calibrated so that the valve element 218 will rotate from the position shown in FIGURE 5A to the position shown in FIGURE 5B when the temperature increases.

The contour of the end of the valve element 218, which is indicated generally at 220, can be varied depending upon the characteristics of the fluid that is used and depending upon the particular timing requirements in the engagement and release of the transmission friction elements for any particular transmission installation.

By employing the variable orifice of my invention, a greater restriction can be introduced into the common feed passage for the clutch 58 and the servo 72 when the operating temperature is low. Thus during a 2–3 upshift, the degree of overlap in the engagement and release of the friction elements is achieved regardless of the increase in viscosity of the fluid. At the same time, an undesirable tie-up (i.e., the simultaneous engagement of the clutch and the brake) is avoided when the operating temperature subsequently increases and a 2–3 upshift subsequently is initiated. This is achieved because the orifice that controls the rate of flow to the common feed passage will permit a relatively rapid delivery of fluid to the clutch. But since the simultaneous fluid delivery to the brake servo is adequate, the clutch will not become fully engaged until the servo release pressure has been built up to the desired value.

In the embodiment of FIGURES 5A and 7A the degree of restriction will vary with the angular rotation of the valve element 218 with a linear relationship. This is true with a contour that is shown. On the other hand, deviation from this linear relationship can be achieved, if desired, simply by changing the shape of the end 220 of the valve 218.

Having thus described preferred forms of my invention, what I claim and desire to secure by use of U.S. Letters Patent is:

1. In a control system for a power transmission mechanism adapted to deliver driving torque from a driving member to a driven member, said transmission mechanism comprising relatively movable gear elements adapted to define at least two torque delivery paths, fluid pressure operated clutch means for connecting together for rotation in unison two torque delivery elements of said mechanism, fluid pressure operated brake means for anchoring one of said gear elements to establish a torque reaction point, a fluid pressure source, conduit structure connecting said clutch means and said brake means to said source including a fluid pressure distributor valve, said conduit structure including separate branch portions extending to said clutch means and said brake means, respectively, and including also a portion common to said clutch means and said brake means, said distributor valve being situated in said common portion and having two operating positions, means for moving said distributor valve from a pressure distributing position to a pressure exhausting position, and a thermostatically controlled valve orifice located in said common passage portion intermediate said distributor valve and said clutch means and brake means, said valve orifice comprising a movable valve element adapted to move from a fluid flow restricting position to a relatively unrestricted flow position, and a thermostatic valve operator responsive to operating temperature of said fluid to shift said valve element toward a free fluid flow position upon an increase in temperature.

2. In a power transmission mechanism adapted to deliver driving torque from a driving member to a driven member, relatively movable gear elements defining plural torque delivery paths between said driving member and said driven member, including a fluid pressure operated clutch and a fluid pressure operated brake, said brake comprising a movable piston defining in part a pair of opposed fluid pressure chambers, said brake being applied to anchor one of said gear elements when pressure is distributed to one side of said brake piston, said brake being released when pressure is distributed to the other side and to one side of said brake piston simultaneously, a fluid pressure source, conduit structure connecting directly said source and said one side of said brake piston, other conduit structure connecting said clutch and the other side of said brake piston, including separate branch passages extending from a common portion of said other conduit structure to said clutch and said other side of said brake piston, respectively, a fluid pressure distributor valve situated in said common conduit structure portion for alternately interrupting and establishing fluid flow from said source to said clutch and said other side of said brake piston, and thermostatically controlled orifice valve means located in said common conduit structure portion between said distributor valve and said clutch and brake, said valve orifice comprising a movable valve element adapted to progressively restrict said other conduit structure as it is shifted in one direction and to establish a relatively free fluid flow condition in said other conduit structure upon movement thereof in the other direction, and a temperature sensitive thermostatic operator connected to said valve orifice for shifting the latter in said other direction upon an increase in the temperature of said fluid.

3. The combination as set forth in claim 1 wherein said thermostatic operator comprises a sealed fluid chamber, said chamber being filled with liquid, one side of the valve element of said valve orifice being in fluid communication with said chamber whereby an increase in volume of fluid in said chamber due to an increase in temperature of the operating fluid produces a valve shifting effort to open said common portion.

4. The combination as set forth in claim 1 wherein said valve element comprises a valve element having a surface of predetermined contour in fluid communication with said common conduit structure portion, a thermostatic, bimetallic member connected to said valve element, said bimetallic element being adapted to move said contoured surface relative to said common conduit structure portion to vary the fluid flow restriction thereof upon pressure distribution to said clutch and said brake during speed ratio changes, the fluid flow restriction provided by said orifice being greater when the operating temperature of said fluid is low.

5. The combination as set forth in claim 2 wherein said thermostatic operator comprises a sealed fluid chamber, said chamber being filled with liquid, one side of the valve element of said valve orifice being in fluid communication with said chamber whereby an increase in volume of fluid in said chamber due to an increase in temperature of the operating fluid produces a valve shifting effort to open said common portion.

6. The combination as set forth in claim 2 wherein said valve element comprises a valve element having a surface of predetermined contour in fluid communication with said common conduit structure portion, a thermostatic, bimetallic member connected to said valve element, said bimetallic element being adapted to move said contoured surface relative to said common conduit structure portion to vary the fluid flow restriction thereof upon pressure distribution to said clutch and said other side of said brake piston during speed ratio changes, the fluid flow restriction provided by said orifice valve being greater when the operating temperature is low.

7. The combination as set forth in claim 6 wherein said valve element comprises a cylindrical portion, said bimetallic spring being connected to said cylindrical portion and adapted to rotate the same upon a change in temperature of the operating fluid.

References Cited

UNITED STATES PATENTS

| | | | |
|---|---|---|---|
| 2,505,450 | 4/1950 | Wemp | 192—82 X |
| 2,603,420 | 7/1952 | Tacchi. | |
| 2,935,999 | 5/1960 | Hock et al. | 137—468 |
| 3,095,755 | 7/1963 | Duffy | 74—869 X |

DONLEY J. STOCKING, Primary Examiner

THOMAS C. PERRY, Assistant Examiner

U.S. Cl. X.R.

74—869; 192—82; 236—100, 101